Dec. 8, 1964    J. C. WASILEWSKI    3,160,477
THERMOMETRIC TITRATING APPARATUS
Filed Jan. 29, 1962    3 Sheets-Sheet 1

INVENTOR.
JOSEPH C. WASILEWSKI
BY Herman L. Gordon
ATTORNEY

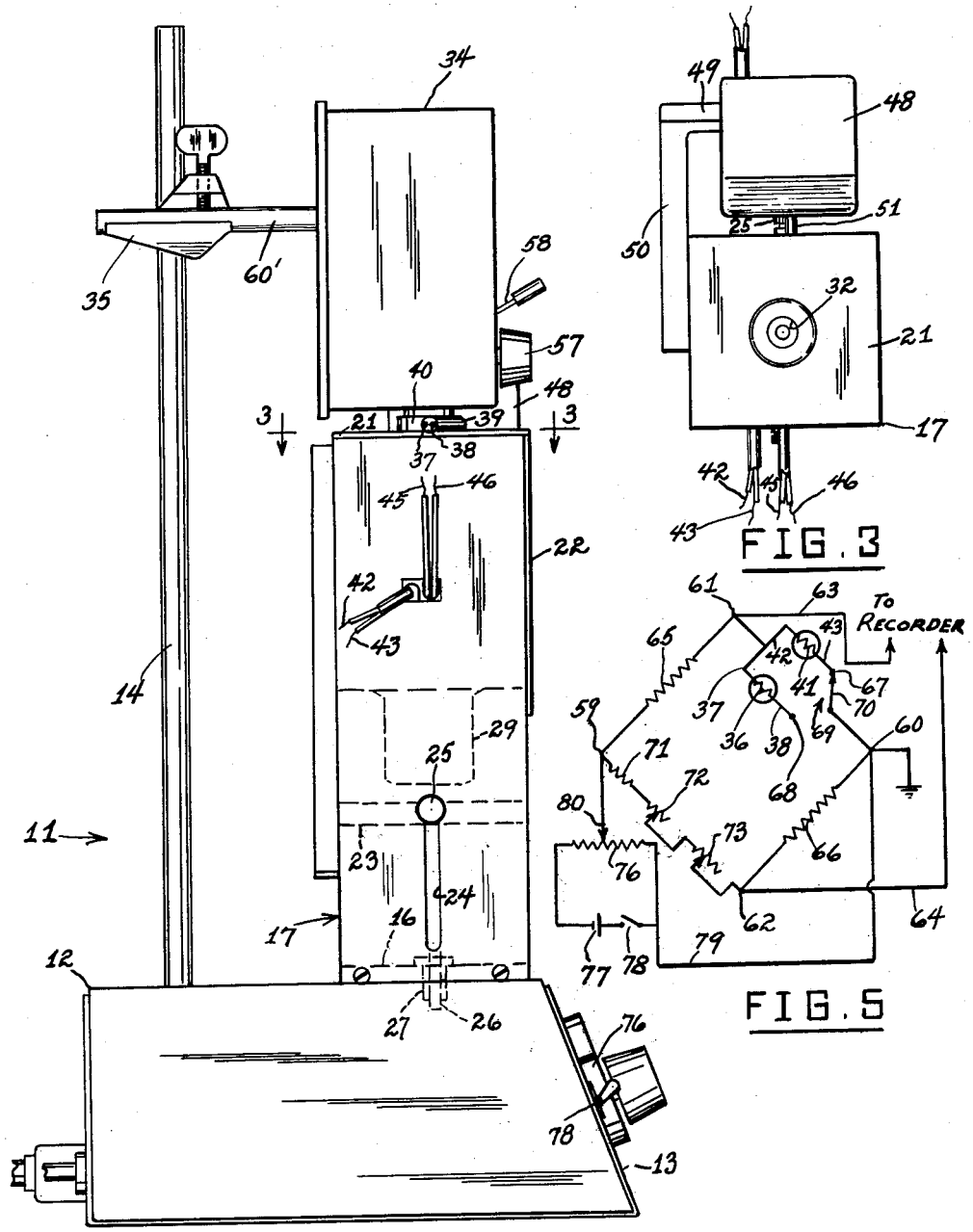

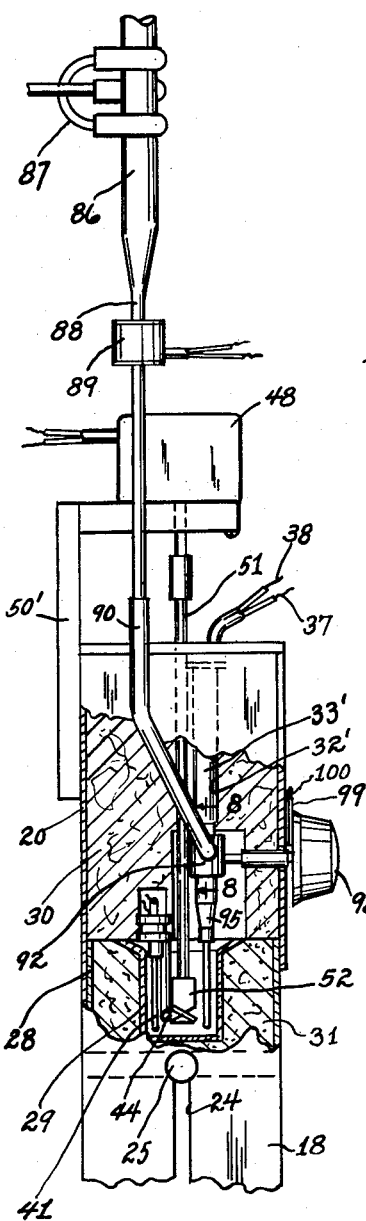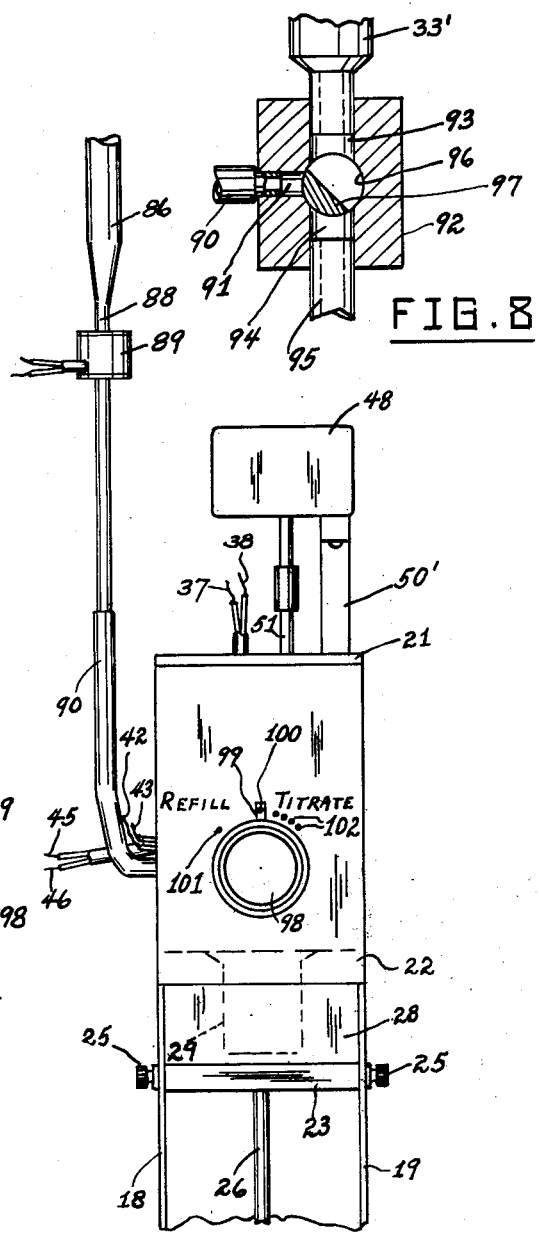

United States Patent Office 3,160,477
Patented Dec. 8, 1964

3,160,477
THERMOMETRIC TITRATING APPARATUS
Joseph C. Wasilewski, Silver Spring, Md., assignor to American Instrument Company, Inc., Silver Spring, Md.
Filed Jan. 29, 1962, Ser. No. 169,580
14 Claims. (Cl. 23—253)

This invention relates to titration apparatus, and more particularly to an apparatus for use in thermoanalytical titrimetry for measuring heats of reaction during a titration.

A main object of the invention is to provide a novel and improved thermometric titrating apparatus for use in measuring the heats of reaction during a titration rather than the exchange of free energy which characterizes conventional types of titration, such as potentiometric titration, conductometric titration, colorimetric titration, and the like.

A further object of the invention is to provide an improved thermometric titrating apparatus which may be employed to rapidly and accurately analyze many reactions which cannot be easily analyzed by conventional titrating techniques and which relies on the measurement of heats of reaction during a titration rather than the exchange of free energy, the apparatus being relatively simple in construction, being easy to operate, and providing accurate and positive indications of the end points of titrations, as well as other valuable information relating to the reactions being studied.

A still further object of the invention is to provide an improved thermometric titrating apparatus which includes an adiabatic chamber constructed of relatively inexpensive but rugged materials, which is easy to manipulate, which provides accurate control of the rate of supply of titrant, and which is provided with means for accurately controlling temperature conditions in the titration chamber.

Further objects and advantages of the invention will become apparent from the following description and claims, and from the accompanying drawings, wherein:

FIGURE 2 is a side elevational view of the titration apparatus of FIGURE 1.

FIGURE 3 is a horizontal cross-sectional view taken substantially on the line 3—3 of FIGURE 2, with the titrant burette removed.

FIGURE 5 is a schematic wiring diagram of the temperature measuring circuit employed in the titration apparatus of FIGURES 1 to 4.

FIGURE 6 is a fragmentary side elevational view, partly in vertical cross-section, of a modified thermometric titration apparatus according to the present invention employing gravity feed of the titrant.

FIGURE 7 is a fragmentary front elevational view of the apparatus of FIGURE 6.

FIGURE 8 is an enlarged vertical cross-sectional detail view taken substantially on the line 8—8 of FIGURE 6.

Figures 1, 4, 9:
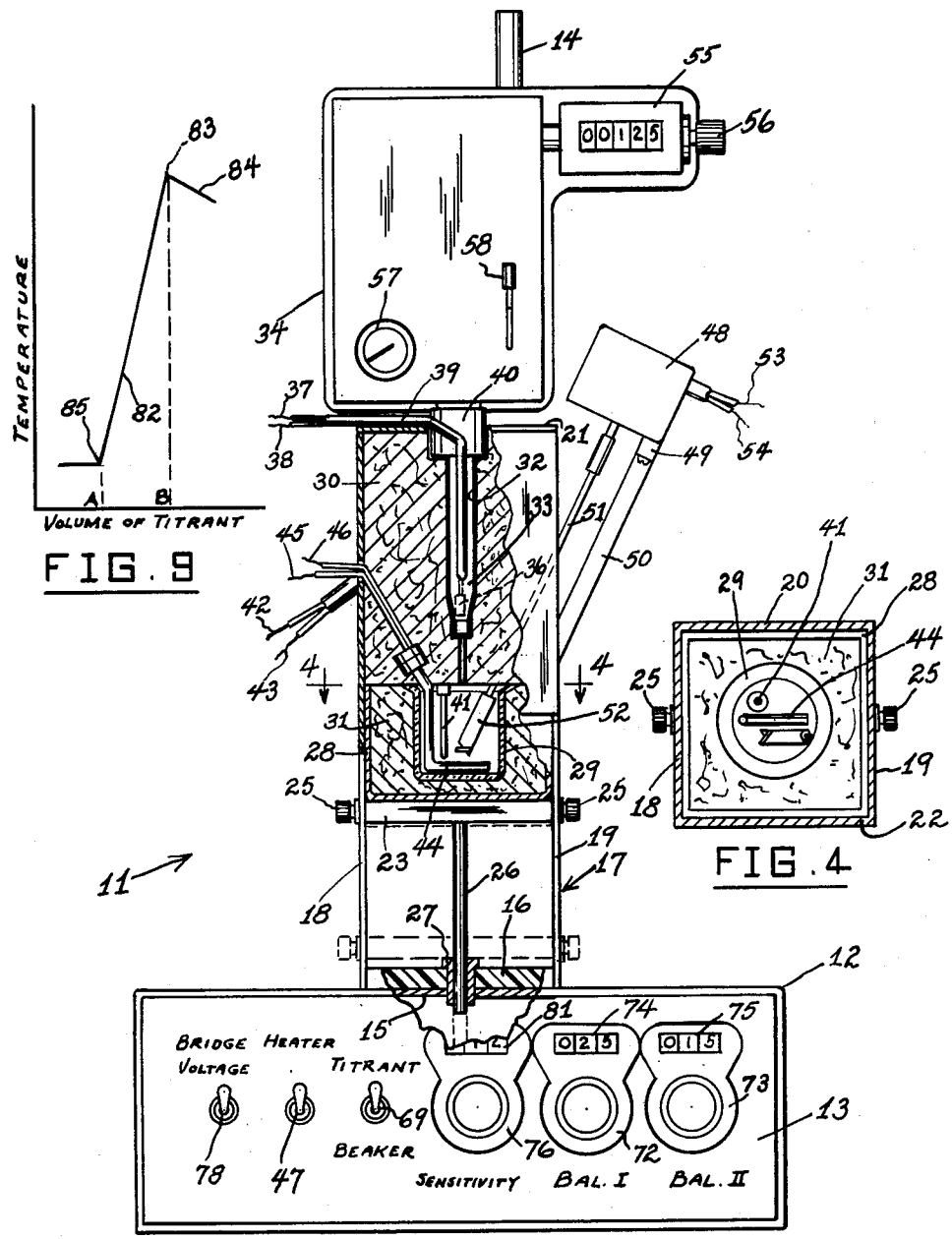
FIGURE 1 is a front elevational view, partly in vertical cross-section, of an improved thermometric titration apparatus constructed in accordance with the present invention.
FIGURE 4 is a horizontal cross-sectional view taken substantially on the line 4—4 of FIGURE 1.
FIGURE 9 is a graph showing a typical thermometric titration curve.

Many reactions cannot be rapidly and accurately measured by conventional methods of titration. For example, in titrating boric acid with sodium hydroxide using the well-known potentiometric method of titration, it is very difficult to discern the end point of the titration. However, if the titration is performed thermochemically, the end point is well-defined. This and other similar reactions are discussed in an article entitled "Thermochemical Titrations" by Joseph Jordan, Record of Chemical Progress, vol. 19, No. 4 (1958).

Thermometric titrations depend upon both free energy and entropy changes, whereas potentiometric titrations depend on free energy changes only. A thermometric titration is one which is performed in an adiabatic system and which yields a plot of temperature of the titrated solution versus volume of titrant added thereto, for example, as is illustrated in FIGURE 9. The general procedure to be followed is to add titrant from a thermostatted burette to a solution (titrate) contained within a thermally insulated vessel while observing or measuring the accompanying temperature changes.

Referring to the drawings, and more particularly to FIGURES 1 to 5, 11 generally designates one form of an improved titration apparatus constructed in accordance with the present invention. The apparatus 11 comprises a supporting housing 12 containing the electrical circuit components of the apparatus, said housing being provided with the downwardly and forwardly sloping control panel 13 on which the electrical control members of the device are mounted. Rigidly secured to the rear portion of the top wall 15 of housing 12 is the vertical supporting post 14. Secured on the forward portion of said top wall 15 is a rectangular block 16.

Designated at 17 is an upstanding rectangular housing having vertical side walls 18, 19, a vertical rear wall 20, and a horizontal top wall 21. Housing 17 is provided with a front wall segment 22 which extends downwardly from top wall 21 and which terminates a substantial distance above the bottom plane of the housing, so that said housing is open at its lower front portion. The block 16 is received in the lower end of the housing, and the bottom marginal portions of side walls 18, 19 and rear wall 20 are secured respectively to the side and rear edges of block 16, thus securing housing 17 in a vertical upstanding position on the top wall 15 of the supporting housing 12.

Slidably disposed in the lower portion of housing 17 is a rectangular block 23. The side walls 18 and 19 of said housing are formed with vertical slots 24 through which extend respective headed clamping screws 25, 25 which are threadedly engaged in the intermediate portions of the side edges of block 23, whereby the block may be clamped in its elevated position, shown in full line view in FIGURE 1.

Rigidly secured centrally to the underside of block 23 is a depending vertical guide rod 26 which extends slidably through a guide bushing 27 secured in block 16 and extending through wall 15. Rod 26 guides the block 23 for vertical movement between its elevated full line position and its lowered dotted view position illustrated in FIG. 1.

Secured on block 23 is a thin-walled receptacle 28, of thin metal, aluminum foil, or the like, containing a mass 31 of rigid heat-insulating material, such as Styrofoam, or the like, said material being formed with a central cavity in which is mounted a glass beaker 29 adapted to contain the titrate solution. Secured in the upper portion of housing 17 is another mass 30 of rigid heat-insulating material, such as Styrofoam, or the like, the bottom plane of the material 30 being located well above the level of the bottom edge of front wall segment 22, as shown in FIGURE 1. Thus, with the block 23 clamped in its elevated full line position of FIGURE 1, the top surface of heat-insulating mass 31 is in contact with the bottom surface of heat-insulating mass 30, and the beaker 29 is substantially completely surrounded by the heat-insulating material. When the clamping screws 25, 25 are released, the block 23 may be lowered to its dotted view position shown in FIGURE 1. In the lowered position of block 23, the top surface of mass 31 is a substantial distance below the bottom edge of front wall segment 22, allowing free access to the beaker 29 from the front of the apparatus.

The top wall 21 is centrally apertured, and the insulating mass 30 is formed with a central bore 32 suitably shaped to receive the depending dispensing reservoir portion 33 of an automatic dispensing burette assembly 34, which may be substantially similar to the titration burette assembly shown in U.S. Patent No. 2,925,198 to Sidney Healey. The burette assembly 34 is provided with a horizontally extending supporting rod 60' which is fastened to the vertical supporting post 14 by means of a conventional instrument clamp 35, as shown in FIGURE 2.

A thermistor 36 is mounted inside the reservoir 33, said thermistor being sensitive to the temperature of the titrant in said reservoir. The thermistor 36 is provided with a pair of lead wires 37 and 38 extending sealingly through the wall of the burette and being contained in a cable 39 extending upwardly along the burette and outwardly through the top end of the bore 32 adjacent the burette clamping connector 40.

A second thermistor unit 41 is mounted in the heat-insulating mass 30 and depends from its bottom surface in a position to be received in beaker 29, when said beaker is in its elevated position shown in FIGURE 1. The thermistor unit 41 is provided with the lead wires 42 and 43.

An electric heating element 44 is secured in the heat-insulating mass 30 and depends from its bottom surface in a position to be received in the beaker 29 when the beaker is in its elevated position, as shown in FIGURE 1. The heating element 44 is provided with the lead wires 45 and 46, and is connected to a suitable source of current, not shown, through a manually operated control switch 47 mounted on panel 13.

Designated at 48 is a stirring motor which is mounted on the top arm 49 of a right-angled inclined supporting bar 50 secured to the rear wall of housing 17. The motor 48 is drivingly coupled to an inclined stirrer shaft 51 which extends through the side wall 19 and through the lower portion of mass 30, said shaft carrying a conventional stirrer 52 in a position to be received in beaker 29 when the beaker is in its elevated position shown in FIGURE 1. The lead wires 53 and 54 of motor 48 are connected to a suitable current source through a control switch, not shown.

The titration burette assembly 34 includes a counter 55 having a resetting knob 56 by means of which the counter may be set to zero at the beginning of a titration operation. The driving motor of the assembly 34 is of a constant-speed type, and the motor speed may be adjusted to a desired value by means of a potentiometer provided with a control knob 57. A two-pole, three-position switch 58 is provided on the assembly 34 to control the direction of rotation of the shaft of the driving motor of assembly 34, as is fully described in U.S. Patent No. 2,925,198.

The volume of titrant discharged from the reservoir 33 is accurately determinable from the reading of counter 55, which may be calibrated so as to be direct-reading in volumetric units.

The temperature-measuring circuit of the apparatus 11 is shown in FIGURE 5, and comprises a Wheatstone bridge having the input junctions 59 and 60 and the output junctions 61 and 62. The output junctions 61 and 62 are connected by wires 63 and 64 to a conventional recorder.

Respective fixed resistors 65 and 66 are connected across junctions 59, 61 and 62, 60, defining two opposing arms of the Wheatstone bridge. The lead wires 42 and 37 of thermistors 41 and 36 are connected to the junction 61. The lead wires 43 and 38 are connected to respective fixed contacts 67 and 68 of a two-position selector switch 69, mounted on panel 13. The pole 70 of switch 69 is connected to junction 60.

Connected in series between junctions 59 and 62 are a fixed resistor 71, a first balance rheostat 72 and a second balance rheostate 73. The rheostats 72 and 73 are of the direct-indicating type, and are provided with resistance-value indicating counters 74 and 75 to provide readings which may be employed, in conjunction with a calibration chart, to determine absolute temperature values in the titration vessel 29, as will be presently described.

A potentiometer 76 has its winding connected in series with a constant voltage source, such as a battery 77, and a control switch 78. One terminal of said winding is connected by a wire 79 to the junction 60, which may be grounded, as shown. The adjustable contact 80 of the potentiometer is connected to the junction 59. Potentiometer 76 is also of the direct-indicating type and is provided with the indicating counter 81, whose reading is thereby in accordance with the value of voltage applied to the bridge input terminals 59 and 60 when switch 78 is closed.

With the bridge set to provide a given sensitivity, namely, with potentiometer 76 adjusted to provide a given input voltage, the balance rheostats 72 and 73 may be employed to set the recorder pen at a desired point on the recorder scale. Also, by referring the combined readings of the counters 74 and 75 to a calibration chart for the instrument, absolute temperature readings of the temperature in the beaker 29 can be determined.

In a typical procedure, titrate solution is placed in the beaker 29, and the block 23 is then elevated and locked in the position of FIGURE 1. The titrant temperature is measured by operating switch 69 to the "Titrant" position, which causes pole 70 to engage contact 68 and which therefore connects thermistor 36 across the bridge junctions 61 and 60. The titrate temperature is then measured by operating switch 69 to the "Titrate" position, which connects the thermistor 41 across junctions 61 and 60 in place of thermistor 36. The temperatures of the titrant and titrate should be stabilized to substantially the same value prior to starting the titration. To provide a final thermometric curve which gives a sharp end point when an exothermic reaction is being studied, a small quantity of heat is preferably applied to the beaker titrate solution prior to starting the titration, by energizing the heater element 44 sufficiently to bring the titrate solution temperature slightly above the titrant temperature, for example, by about 0.25° C.

Titrate is then added to beaker 29 by operating the feed device 34, the stirrer motor 48 being energized to insure thorough mixing of the titrant with the titrate. The reaction produces a temperature rise in the beaker which is shown by the recorder, for example, by the rising portion 82 of the typical titration curve shown in FIGURE 9. A sharp end point 83 is indicated upon completion of the reaction, since when the reaction no longer evolves heat, subsequent addition of titrant causes a cooling of the beaker, since the titrant is at a relatively low temperature, as shown by the portion 84 of the curve of FIGURE 9.

The volume of titrant added between the starting point 85 of the titration and the end point 83 can be determined from the counter 55. This volume can also be determined directly from the curve of FIGURE 9, since both the device 34 and the recorder strip are driven at a constant speed, enabling the recorder strip to be calibrated directly in volumetric units, whereby the volume of titrant added during the titration will be represented by the distance between the points A and B in FIGURE 9.

The heating element 44 may be employed as a means of calibrating the device. With the resistance of the heater known, a definite voltage may be applied thereto for a carefully measured time interval, with the heater immersed in a liquid in the beaker 29 of known volume, specific heat and density. By measuring the temperature rise of the liquid, the percentage of heat lost due to inefficiency of the adiabatic chamber can be calculated.

The heater 44 may be employed to warm the beaker solution, when required, the equilibrate the temperature thereof with that of the titrant, and to slighly elevate the temperature of the beaker solution, as above mentioned, to provide a sharp end point when an exothermic reaction is being studied.

FIGURES 6 and 7 illustrate a modified form of the invention wherein gravimetric feed of titrant is employed instead of forced feed. In this arrangement, the titrant burette, shown at 33', is mounted in a vertical bore 32' formed in the upper mass 30 of heat-insulating material, the burette 33' being supplied with titrant by gravity from an external supply reservoir 86 supported vertically by a conventional spring clamp assembly 87 extending from and suitably fastened to the post 14. The reservoir 86 is provided with a bottom discharge conduit 88 which includes a solenoid valve 89 and which is connected to a conduit 90 leading to one inlet port 91 of a three-way valve 92 provided in the lower portion of burette 33'. As shown in FIGURE 8, the body of valve 92 is formed with the upper port 93, communicating with the upper main storage space of the burette 33' and with the lower port 94 communicating with the lower discharge portion 95 of the burette. The valve is formed with the horizontal bore 96 communicating with the ports 91, 93 and 94, and is provided with a valve rotor 97 shaped to provide selective communication between port 93 and either of ports 91 or 94, respectively, for filling the burette and for subsequently feeding titrant to the lower discharge portion 95 thereof.

Valve rotor 97 is provided with an external operating knob 98 which is disposed adjacent the front wall segment 22 and which is provided with a spring arm 99 formed at its outer end with an inwardly directed indentation or detent portion 100 which is engageable either in a "refill" locking aperture 101 formed in wall segment 22, or in any one of an arcuate series of "feed" apertures 102 formed in said wall segment, the apertures 101 and 102 being at the same radial distance from the axis of knob 98. When yieldable detent arm 99 is engaged with the aperture 101, rotor 97 is positioned to connect port 91 to port 93, allowing the burette 33' to be filled with titrant from reservoir 86 when solenoid valve 89 is opened. When the knob 98 is rotated to engage the indentation 100 of yieldable detent arm 99 with a selected one of the "feed" apertures 102, the titrant will gravitate from the burette 33' through the discharge portion 95 thereof into the beaker 29 at an accurately predetermined rate, depending upon which aperture 102 is engaged, since each aperture 102 represents a different definite discharge orifice area between rotor 97 and port 94.

An accurately known volume of titrant will therefore gravitate into beaker 29 in a given time interval, and since the recorder strip moves at a constant speed, the recorder strip may be calibrated directly in volumetric units, as in the case of the previously described form of the invention.

In the arrangement of FIGURES 6 and 7, the stirrer motor 48 is mounted above the housing 17 on a right-angled bracket bar 50' secured to rear wall 20, and the stirrer shaft 51 extends vertically through the upper portion of the housing, as shown in FIGURE 6, with the stirrer 52 located in a position to be received in the beaker 29 when the beaker is in its elevated position.

While certain specific embodiments of a thermometric titrating apparatus have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A thermometric titrator comprising a support, a titrant burette mounted in the upper portion of said support, vertically slidable support means in the lower portion of the support, a titrate beaker on said support means in a position vertically aligned with said burette and movable to a position subjacent the burette when said support means is elevated, means defining a substantially adiabatic chamber enclosing said beaker when said support means is elevated, and temperature-sensitive means depending from said support in a position to enter the beaker when said support means is elevated to measure the temperature in said chamber.

2. A thermometric titrator comprising a support, a titrant burette mounted in the upper portion of said support, vertically slidable support means in the lower portion of the support, a titrate beaker on said support means in a position vertically aligned with said burette and movable to a position subjacent the burette when said support means is elevated, means defining a substantially adiabatic chamber enclosing said beaker when said support means is elevated, and temperature-sensitive means depending from said support in a position to enter the beaker when said support means is elevated to measure the temperature in said chamber, and means on the support to apply heat to the contents of said beaker.

3. A thermometric titrator comprising a support, a titrant burette mounted in the upper portion of said support, vertically slidable support means in the lower portion of the support, a titrate beaker on said support means in a position vertically aligned with said burette and movable to a position subjacent the burette when said support means is elevated, means defining a substantially adiabatic chamber enclosing said beaker when said support means is elevated, means to measure the temperature in the burette, and temperature-sensitive means depending from said support in a position to enter the beaker when said support means is elevated to measure the temperature in said chamber.

4. A thermometric titrator comprising a support, a titrant burette mounted in the upper portion of said support, vertically slidable support means in the lower portion of the support, a titrate beaker on said support means in a position vertically aligned with said burette and movable to a position subjacent the burette when said support means is elevated, means to releasably secure said support means in an elevated position, means defining a substantially adiabatic chamber enclosing said beaker when said support means is secured in said elevated position, and temperature-sensitive means depending from said support in a position to enter the beaker when said support means is elevated to measure the temperature in said chamber.

5. A thermometric titrator comprising a support, a titrant burette mounted in the upper portion of said support, vertically slidable support means in the lower portion of the support, a titrate beaker on said support means in a position vertically aligned with said burette and movable to a position subjacent the burette when said support means is elevated, means to releasably secure said support means in an elevated position, means defining a substantially adiabatic chamber enclosing said beaker when said support means is elevated and secured in said elevated position, means to measure the temperature in the burette, temperature-sensitive means depending from said support in a position to enter the beaker when said support means is elevated to measure the temperature in said chamber, and means on the support to apply heat to the contents of said beaker.

6. A thermometric titrator comprising a support, a titrant burette mounted in the upper portion of said support, means to discharge titrant from said burette at a predetermined rate, vertically slidable support means in the lower portion of the support, a titrate beaker on said support means in a position vertically aligned with said burette and movable to a position subjacent the burette when said support means is elevated, means to releasably secure said support means in an elevated position, means defining a substantially adiabatic chamber enclosing said beaker when said support means is secured in said elevated position, means to measure the temperature in the burette, temperature-sensitive means depending from said support in a position to enter the beaker when said support means is elevated to measure the temperature in said chamber, and means on the support to apply heat to the contents of said beaker.

7. A thermometric titrator comprising a vertical support including a mass of heat-insulating material in its upper portion, a titrant burette in said upper portion surrounded by said material, a second mass of heat-insulating material slidably mounted in the lower portion of said support, a titrate beaker in said second mass opening at the top portion of said second mass, means to releasably secure said second mass in an elevated position with the top of the second mass adjacent the bottom of said first mass and with the beaker in a position to receive titrant from the burette, whereby the beaker is enclosed in a substantially adiabatic chamber, and temperature-sensitive means depending from said first mass of heat-insulating material in a position to enter the beaker when said second mass is raised to said elevated position to measure the temperature in said beaker.

8. The structure of claim 7, and means to measure the temperature in the burette.

9. The structure of claim 7, and a heating element depending from said first-named mass in a position to be received in said beaker when the second mass is in said elevated position.

10. A thermometric titrator comprising a vertical support including a mass of heat-insulating material in its upper portion, a titrant burette in said upper portion surrounded by said material, a second mass of heat-insulating material slidably mounted in the lower portion of said support, a titrate beaker in said second mass opening at the top portion of said second mass, means to releasably secure said second mass in an elevated position with the top of the second mass adjacent the bottom of said first mass and with the beaker in a position to receive titrant from the burette, whereby the beaker is enclosed in a substantially adiabatic chamber, means to measure the temperature in the burette, a heating element, means to support said heating element in a position to be received in said beaker when the second mass is in said elevated position, and temperature-sensitive means depending from said first mass of heat-insulating material in a position to enter the beaker when said second mass is raised to said elevated position to measure the temperature in said beaker.

11. A thermometric titrator comprising a vertical support including a mass of heat-insulating material in its upper portion, a titrant burette in said upper portion surrounded by said material, means to discharge titrant from said burette at a predetermined rate, a second mass of heat-insulating material slidably mounted in the lower portion of said support, a titrate beaker in said second mass opening at the top portion of said second mass, means to releasably secure said second mass in an elevated position with the top of the second mass adjacent the bottom of said first mass and with the beaker in a position to receive titrant from the burette, whereby the beaker is enclosed in a substantially adiabatic chamber, and temperature-sensitive means depending from said first mass of heat-insulating material in a position to enter the beaker when said second mass is raised to said elevated position to measure the temperature in said beaker.

12. A thermometric titrator comprising a vertical support including a mass of heat-insulating material in its upper portion, a titrant burette in said upper portion surrounded by said material, means to discharge titrant from said burette at a predetermined rate, a second mass of heat-insulating material slidably mounted in the lower portion of said support, a titrate beaker in said second mass opening at the top portion of said second mass, means to releasably secure said second mass in an elevated position with the top of the second mass adjacent the bottom of said first mass and with the beaker in a position to receive titrant from the burette, whereby the beaker is enclosed in a substantially adiabatic chamber, means to measure the temperature in the burette, a heating element, means to support said heating element in a position to be received in said beaker when the second mass is in said elevated position, and temperature-sensitive means depending from said first mass of heat-insulating material in a position to enter the beaker when said second mass is raised to said elevated position to continuously measure the temperature in said beaker.

13. The structure of claim 7, and a motor-driven stirrer mounted on said support and having a stirring element depending from said first-named mass in a position to be received in said beaker when the second mass is in said elevated position.

14. In combination with the structure of claim 7, an electrical heating element depending from said first-named mass in a position to be received in said beaker when the second mass is in said elevated position, and a motor-driven stirrer mounted on said support and having a stirring element depending from said first-named mass in a position to be received in said beaker when the second mass is in said elevated position.

References Cited in the file of this patent

UNITED STATES PATENTS

| Re. 19,717 | Lipham | Oct. 1, 1935 |
| 2,809,100 | Krasl | Oct. 8, 1957 |
| 2,925,198 | Healey | Feb. 16, 1960 |
| 2,955,025 | Conlon | Oct. 4, 1960 |
| 2,546,770 | Morey | Mar. 27, 1961 |

OTHER REFERENCES

Keily et al.: Analytical Chemistry, vol. 28, No. 8, pp. 1294–7 (August 1956), Amer. Chem. Soc., Washington, D.C.

Jordan: Record of Chemical Progress, vol. 19, No. 4, pp. 193–213 (December 1958), Wayne State Univ. Press, Detroit, Michigan.